(12) United States Patent
Dong et al.

(10) Patent No.: US 10,235,915 B2
(45) Date of Patent: Mar. 19, 2019

(54) DEVICE AND METHOD FOR DETECTING PERFORMANCE OF PANEL DRIVING CIRCUIT

(71) Applicants: Boe Technology Group Co., Ltd., Beijing (CN); Beijing Boe Display Technology Co., Ltd., Beijing (CN)

(72) Inventors: Dianzheng Dong, Beijing (CN); Bin Zhang, Beijing (CN); Qiang Zhang, Beijing (CN); Guangxing Wang, Beijing (CN); Kan Zhang, Beijing (CN); Junwei Wang, Beijing (CN); Xin Gai, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 50 days.

(21) Appl. No.: 15/512,640

(22) PCT Filed: Sep. 5, 2016

(86) PCT No.: PCT/CN2016/098011
§ 371 (c)(1),
(2) Date: Mar. 20, 2017

(87) PCT Pub. No.: WO2017/118066
PCT Pub. Date: Jul. 13, 2017

(65) Prior Publication Data
US 2018/0233073 A1    Aug. 16, 2018

(30) Foreign Application Priority Data
Jan. 7, 2016  (CN) .......................... 2016 1 0009401

(51) Int. Cl.
*G09G 3/20* (2006.01)
*F21V 8/00* (2006.01)
(Continued)

(52) U.S. Cl.
CPC ........... *G09G 3/006* (2013.01); *G02B 6/0008* (2013.01); *G09G 3/00* (2013.01); *G09G 3/20* (2013.01);
(Continued)

(58) Field of Classification Search
CPC ........... G09G 3/006; G09G 3/00; G01R 31/44
(Continued)

(56) References Cited

U.S. PATENT DOCUMENTS

| 4,843,446 A | 6/1989 | Nishino et al. | |
| 6,707,437 B1 * | 3/2004 | Kuno | G06F 3/147 |
| | | | 313/292 |
| 2003/0019931 A1 * | 1/2003 | Tsikos | G02B 26/10 |
| | | | 235/454 |

FOREIGN PATENT DOCUMENTS

| CN | 1564005 | 1/2005 |
| CN | 1742301 | 3/2006 |

(Continued)

OTHER PUBLICATIONS

First Office Action for Chinese Patent Application No. 201610009401.2 dated Nov. 16, 2017.
(Continued)

*Primary Examiner* — Melissa J Koval
*Assistant Examiner* — Trung Q. Nguyen
(74) *Attorney, Agent, or Firm* — Calfee, Halter & Griswold LLP

(57) ABSTRACT

This disclosure relates to a device and method for detecting performance of panel driving circuit. The device comprises a plurality of point light sources, a plurality of optical fibers,
(Continued)

a light source driving circuit and a detection circuit. The predetermined point light sources are corresponding to predetermined optical fibers, the predetermined optical fibers being one optical fiber or multiple optical fibers of a predetermined combination corresponding to elements of the panel driving circuit. The optical fibers are configured for transmitting the light emitted by the point light sources onto the elements of the panel driving circuit. The detection circuit is for obtaining a performance parameter of the element of the panel driving circuit based on a corresponding relationship between an intensity of illumination for the element of the panel driving circuit and a current value of the element as well as an output signal of the panel driving circuit.

20 Claims, 5 Drawing Sheets

(51) Int. Cl.
*G09G 3/00* (2006.01)
*G09G 3/3208* (2016.01)
*G09G 3/36* (2006.01)

(52) U.S. Cl.
CPC ............ *G09G 3/3208* (2013.01); *G09G 3/36* (2013.01); *G09G 2310/0264* (2013.01)

(58) Field of Classification Search
USPC ..... 324/537, 500, 542, 556, 756.07, 757.02, 324/763.01, 600, 97; 361/719, 720, 736, 361/748, 761
See application file for complete search history.

(56) References Cited

FOREIGN PATENT DOCUMENTS

| | | |
|---|---|---|
| CN | 1774665 | 5/2006 |
| CN | 102005149 | 4/2011 |
| CN | 105609026 | 5/2016 |

OTHER PUBLICATIONS

International Search Report and Written Opinion from PCT/CN16/98011 dated Nov. 28, 2016.
Second Office Action for Chinese Patent Application No. 201610009401.2 dated May 9, 2018.

* cited by examiner

DEVICE AND METHOD FOR DETECTING PERFORMANCE OF PANEL DRIVING CIRCUIT

RELATED APPLICATIONS

The present application is the U.S. national phase entry of PCT/CN2016/098011, with an international filling date of Sep. 5, 2016, which claims the benefit of Chinese Patent Application NO. 201610009401.2, filed on Jan. 7, 2016, the entire disclosure of which is incorporated herein by reference.

FIELD OF THE INVENTION

This disclosure relates to the field of display technology, particularly to a device and method for detecting performance of panel driving circuit.

BACKGROUND

The display panel is an important component of a display device and comprised of pixel units in rows and columns. When the display panel operates, a panel driving circuit in the display device provides a driving signal for the display panel. The driving signal controls thin film transistors (TFTs) in the pixel unit to be turned on and off, so as to achieve driving for the display panel and perform the function of displaying images of the display panel.

However, upon a design for the panel driving circuit is implemented as an end product, it is difficult to change the specific elements in the panel driving circuit, so performance detection needs to be performed to respective elements in the panel driving circuit so as to obtain the influence of the elements in the panel driving circuit to the output signal of the panel driving circuit, thereby improving the future design for the panel driving circuit based on the obtained influence of the elements in the panel driving circuit to the output signal of the panel driving circuit. Conventionally, the performance of the elements in the panel driving circuit is detected by software simulation, however, because the panel driving circuit often operates at the same turn-on and turn-off voltage, and different elements may influence each other during actual operation, performance detection to the elements in the panel driving circuit cannot be performed accurately.

SUMMARY

An objective of this disclosure is to provide a device and method for detecting performance of a panel driving circuit, so as to achieve accurate detection for performance of the elements in the panel driving circuit.

According to an aspect of this disclosure, a device for detecting performance of panel driving circuit is provided, which may comprise a plurality of point light sources, a plurality of optical fibers and a light source driving circuit. The optical fiber is connected with the point light source, the light source driving circuit is configured for driving predetermined point light sources to emit light, the predetermined point light sources being point light sources corresponding to predetermined optical fibers, the predetermined optical fibers being one optical fiber or multiple optical fibers of a predetermined combination corresponding to elements of the panel driving circuit. The optical fibers are configured for transmitting the light emitted by the point light sources onto the elements of the panel driving circuit. The device for detecting performance of the panel driving circuit further comprises a detection circuit for obtaining a performance parameter of the element of the panel driving circuit based on a corresponding relationship between an intensity of illumination for the element of the panel driving circuit and a current value of the element as well as an output signal of the panel driving circuit.

According to another aspect of this disclosure, a method for detecting performance of panel driving circuit is provided, which may be used together with the above device for detecting performance of panel driving circuit. The method comprising: controlling predetermined point light sources to emit light by a light source driving circuit, the predetermined point light sources being point light sources corresponding to predetermined optical fibers, the predetermined optical fibers being one optical fiber or multiple optical fibers of a predetermined combination corresponding to elements of the panel driving circuit; transmitting the light emitted by the predetermined point light sources onto the elements of the panel driving circuit through the predetermined optical fibers; and by means of a detection circuit, obtaining a corresponding relationship between an intensity of illumination for the element of the panel driving circuit and a current value of the element, as well as an output signal of the panel driving circuit, and obtaining a performance parameter of the element of the panel driving circuit based on the corresponding relationship between an intensity of illumination for the element of the panel driving circuit and a current value of the element, as well as the output signal of the panel driving circuit.

Compared to conventional ways of detecting performance for elements in the panel driving circuit using software simulation, the approaches proposed in this disclosure may enable the point light sources corresponding to a certain optical fiber or a plurality of optical fibers of a predetermined combination to emit light and transmit the light emitted by the point light sources onto the elements of the panel driving circuit through the optical fibers, thereby enabling the elements of the panel driving circuit corresponding to the certain optical fiber or the plurality of optical fibers of the predetermined combination to be illuminated by the light. The current values of the elements that are illuminated by the light would change, thereby influencing the output signal of the panel driving circuit. Hence, relatively more accurate detection for the performance parameters of the elements in the panel driving circuit may be achieved based on the change in the current values of the elements and the change in the output signal.

BRIEF DESCRIPTION OF THE DRAWINGS

The drawings are used for providing further understanding to this disclosure and constitute a part of this disclosure. The illustrated embodiments of this disclosure and the description thereof are used for explaining this disclosure, which are illustrative rather than restrictive. In the drawings.

DETAILED DESCRIPTION OF EMBODIMENTS

In order to further explain the device and method for detecting performance of panel driving circuit provided by the embodiments of this disclosure, they will be described in detail with reference to the drawings next.

In the description below, the following reference signs may be used:

| | |
|---|---|
| 10-point light source | 11-optical fiber |
| 12-optical fiber interface | 13-panel driving circuit |
| 14-support structure | 15-light source driving circuit |
| 16-image acquisition component | 151-clock signal unit |
| 152-light source combination unit | 153-logic control unit |
| 154-power supply unit | |

Figure 1:
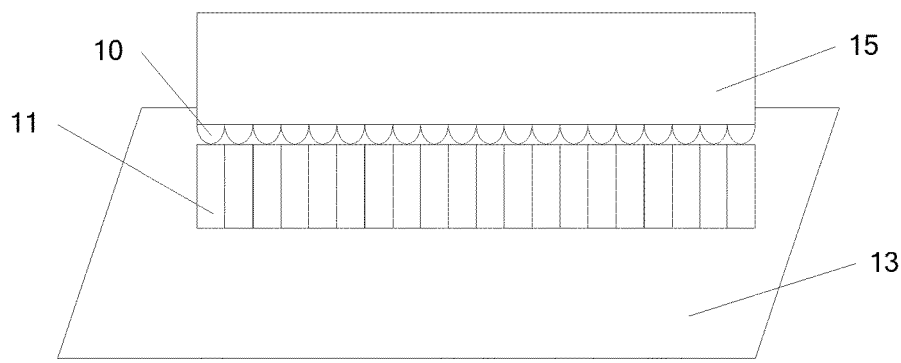
FIG. 1 is a schematic view of a device for detecting performance of panel driving circuit according to an embodiment of this disclosure.

FIG. 1 is a schematic view of a device for detecting performance of panel driving circuit according to an embodiment of this disclosure. The device for detecting performance of panel driving circuit comprises a plurality of point light sources 10, a plurality of optical fibers 11 and a light source driving circuit 15. Each of the plurality of point light sources 10 can emit light independently, and the light source driving circuit 15 may drive predetermined point light sources to emit light. The predetermined point light source can be a point light source 10 corresponding to a predetermined optical fiber, and the predetermined optical fiber may be one optical fiber 11 or multiple optical fibers 11 of a predetermined combination corresponding to the element of the panel driving circuit 13, i.e., the point light sources 10 corresponding to the predetermined optical fibers are driven to emit light. The multiple optical fibers 11 of the predetermined combination can be selected specifically based on specific situations and applications. That is to say, the predetermined combination for the multiple optical fibers 11 is variable. The optical fibers 11 are connected with the point light sources 10, and are used for transmitting the light emitted by the point light sources 10 onto the elements of the panel driving circuit 13. The elements of the panel driving circuit 13 mentioned above may be thin film transistors (TFTs).

Figure 2:
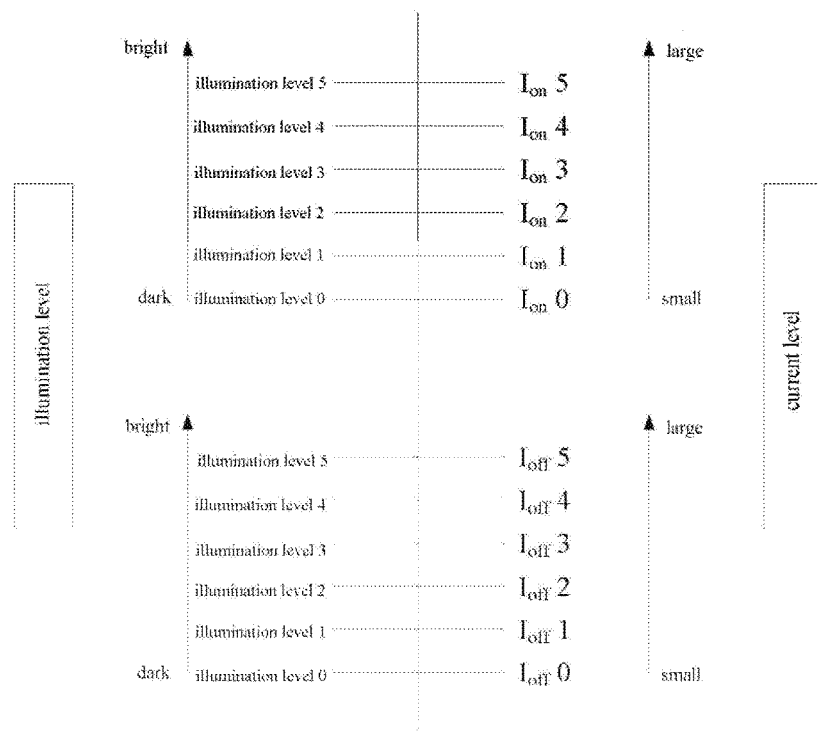
FIG. 2 is a schematic view of a corresponding relationship between an illumination level and a current level for elements of the panel driving circuit according to an embodiment of this disclosure.

It can be appreciated that current value of the element of the panel driving circuit would change when it is illuminated. Take the thin film transistor as an example, the current of the thin film transistor includes a turn-on current and a turn-off current. The values of turn-on current and turn-off current can be represented by current levels, different current levels correspond to different current values. As shown in FIG. 2, different illumination intensity levels (i.e., illumination levels) may correspond to different current levels of the thin film transistor, in FIG. 2, $I_{on}$ represents the turn-on current level of the thin film transistor, $I_{off}$ represents the turn-off current level of the thin film transistor. The illumination level 0 to the illumination level 5 are arranged from dark to bright, the currents for the current levels $I_{on}$ 0 to $I_{on}$ 5 are arranged from small to large, and the currents for the current levels $I_{off}$ 0 to $I_{off}$ 5 are arranged form small to large. When the turned-on thin film transistor is illuminated, the illumination level 0 to the illumination level 5 corresponds to $I_{on}$ 0 to $I_{on}$ 5 in sequence respectively. When the turned-off thin film transistor is illuminated, the illumination level 0 to the illumination level 5 corresponds to $I_{off}$ 0 to $I_{off}$ 5 in sequence respectively.

Compared to the conventional performance detection to elements in the panel driving circuit using software simulation, in this embodiment of the disclosure, the point light sources 10 corresponding to a certain optical fiber 11 or a plurality of optical fibers 11 of a predetermined combination can be enabled to emit light, and then the light emitted by the point light sources 10 is transmitted onto the elements of the panel driving circuit through the optical fibers 11, thereby enabling the elements of the panel driving circuit corresponding to the certain optical fiber 11 or the plurality of optical fibers 11 of a predetermined combination to be illuminated by the light. The current values of the elements that are illuminated by the light would change, thereby influencing the output signal of the panel driving circuit. Hence, relatively more accurate detection can be implemented to the performance parameters of the elements in the panel driving circuit based on the change in the current values of the elements and the change in the output signal.

Figure 3:
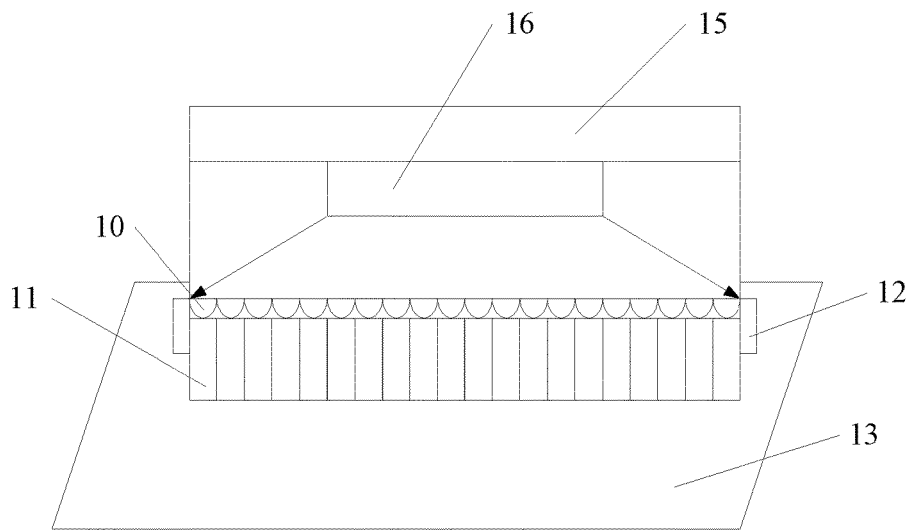
FIG. 3 is a schematic view of a device for detecting performance of panel driving circuit according to another embodiment of this disclosure.
Figure 4:
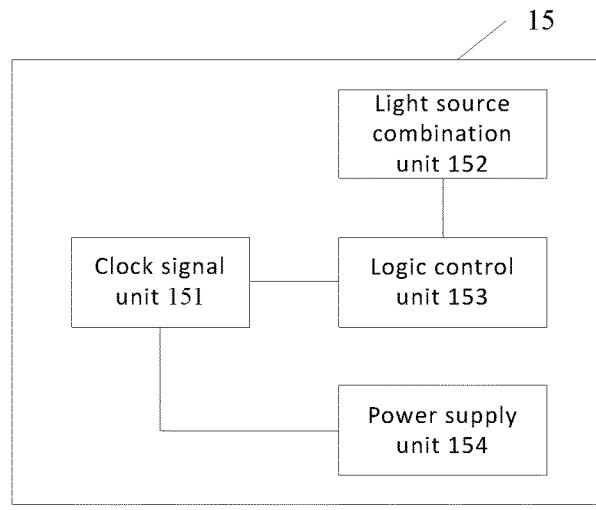
FIG. 4 is a schematic view of a light source driving circuit according to an embodiment of this disclosure.

FIG. 3 is a schematic view of a device for detecting performance of panel driving circuit according to another embodiment of this disclosure. Referring to FIG. 3, on the basis of the embodiment shown in FIG. 1, the device for detecting performance of panel driving circuit further comprises an image acquisition component 16. The image acquisition component is used for acquiring an image of distribution of the elements of the panel driving circuit 13 and an image of distribution of the optical fibers 11, thereby obtaining positions of the elements on the panel driving circuit 13 and positions of the optical fibers 11. FIG. 3 indicates the image acquisition range for the image acquisition component with arrows. The image acquisition component 16 can be a device with the image acquisition function such as a CMOS (complementary metal oxide semiconductor) image sensor or a camera. The image acquisition component 16 obtains the positions of the elements on the panel driving circuit 13 and the positions of the optical fibers 11, so as to enable the light source driving circuit 15 to drive the predetermined point light sources to emit light based on the positions of the elements on the panel driving circuit and the positions of the optical fibers 11. For example, as shown in FIG. 4, the light source driving circuit 15 may comprise a clock signal unit 151, a light source combination unit 152, a logic control unit 153 and a power supply unit 154. The clock signal unit 151 may send clock information to the logic control unit 153, and the clock information may be sent in form of a PWM (pulse width modulation) signal. The light source combination unit 152 may transmit information about the combination of the point light sources 10 to the logic control unit 153. The logic control unit 153 may also set the light emitting parameters for the point light sources. The light emitting parameters include light emitting intensity and light emitting duration. Hence, the logic control unit 153 may determine which point light sources 10 to emit light and the light emitting duration and light emitting intensity thereof based on the clock information and the information about the combination of the point light sources. The power supply unit 154 provides a required voltage for the light source driving circuit 15.

By means of the image acquisition component, the positions of the elements in the panel driving circuit 13 for which performance detection will be carried out can be determined, so as to determine the optical fibers 11 (i.e., the predetermined optical fibers) to which the elements that need performance detection correspond, thereby determining the point light sources 10 (i.e., the predetermined point light sources) that need to emit light. In this way, the light emitted by the predetermined point light sources may illuminate the elements in the panel driving circuit 13 that need performance detection accurately through the predetermined optical fibers, and the accuracy for the performance detection can be further improved.

A further embodiment of this disclosure may utilize an OLED (organic light emitting diode) panel, a LED (light emitting diode) panel or a LCD (liquid crystal display) module to provide the point light sources 10 on the basis of the first embodiment and the second embodiment. That is to say, an OLED panel, a LED panel or a LCD module can be disposed in the device for detecting performance of panel driving circuit, so as to use the light sources in the OLED panel, the LED panel or the LCD module as the point light sources 10. For example, one point light source 10 may correspond to one pixel unit. In order to avoid the OLED panel, the LED panel or the LCD module from shielding the image acquisition range of the image acquisition component, the point light sources 10 may be configured to be movable relative to the image acquisition component 16. For instance, the OLED panel, the LED panel or the LCD module can be arranged to be slideable relative to the image acquisition component, so that the OLED panel, the LED panel or the LCD module can be removed from image acquisition range of the image acquisition component, and the influence to image acquisition of the image acquisition component by the OLED panel, the LED panel or the LCD module may be prevented.

Figure 5:
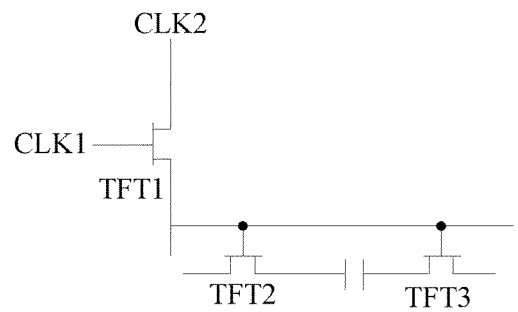
FIG. 5 is a schematic view of a panel driving circuit according to an embodiment of this disclosure.
Figure 6:
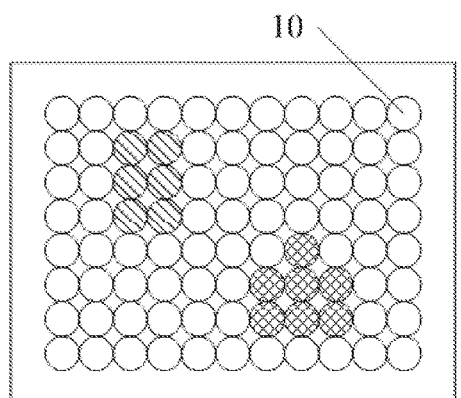
FIG. 6 is a view for schematically showing the arrangement of point light sources according to an embodiment of this disclosure.

In an embodiment, the plurality of optical fibers 11 can be arranged in an array, and one optical fiber 11 may correspond to one point light source 10, as shown in FIG. 3. The optical fibers 11 may be connected to the point light sources 10 through optical fiber interfaces 12. Different elements in the panel driving circuit 13 may correspond to different optical fibers 11, hence, when performance detection is performed to different elements, it is required that the different elements are illuminated. And the point light sources 10 to which the optical fibers 11 corresponding to these elements correspond are required to be driven to emit light. For instance, as shown in FIG. 5, the panel driving circuit 13 may comprise three elements of thin film transistors TFT1, TFT2 and TFT3. The gate of the thin film transistor TFT1 may receive a first clock signal CLK1, and the drain thereof may receive a second clock signal CLK2. In this example, the thin film transistor TFT1 in a turned-on state and the thin film transistor TFT3 in a turned-off state are required to be illuminated. It should be noted that the first clock signal CLK1 and the second clock signal CLK2 may be provided to the clock signal unit 151 mentioned in the previous embodiment, thereby enabling the clock signal unit 151 to send the clock information of the first clock signal CLK1 and the second clock signal CLK2 to the logic control unit 153. As shown in FIG. 6, the device for detecting performance of panel driving circuit may comprise 300 optical fibers 11 numbered G1-G300, thus the device for detecting performance of panel driving circuit may comprise point light sources 10 numbered L1-L300 in one-to-one correspondence with the optical fibers 11. Driving signals TFT-Light for driving the point light sources 10 to emit light may be provided to the point light sources 10 corresponding to the thin film transistors. If the serial numbers of the optical fibers 11 (i.e., the predetermined optical fibers) corresponding to the thin film transistor TFT1 are G35-G40, the serial numbers of the point light sources 10 (i.e., the predetermined point light sources) corresponding to the optical fibers numbered G35-G40 will be L35-L40. If the serial numbers of the optical fibers 11 (i.e., the predetermined optical fibers) corresponding to the thin film transistor TFT3 are G80-G86, the serial numbers of the point light sources 10 (i.e., the predetermined point light sources) corresponding to the optical fibers numbered G80-G86 will be L80-L86.

Figure 7:
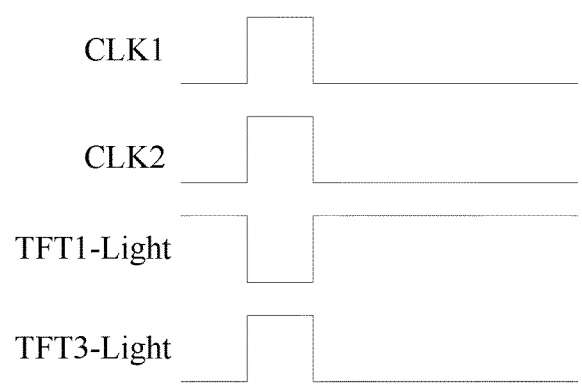
FIG. 7 is a signal timing diagram corresponding to FIG. 5.

FIG. 7 is a signal timing diagram corresponding to the panel driving circuit 13 as shown in FIG. 5. When the first clock signal CLK1 is of a high level, and the second clock signal CLK2 is of a high level, the thin film transistor TFT1 is turned on, and the thin film transistor TFT3 is also turned on. Here, if the turned-on thin film transistor TFT3 is required to be illuminated, then the point light sources 10 numbered L80-L86 are lighted. TFT3-Light represents the driving signal for the predetermined point light sources (i.e., point light sources 10 numbered L80-L86) corresponding to the thin film transistor TFT3, the high level indicates that the point light sources 10 numbered L80-L86 emit light, and the low level indicates that the point light sources 10 numbered L80-L86 are extinguished. When the first clock signal CLK1 is of a low level, the thin film transistor TFT1 is turned off, here, if the turned-off thin film transistor TFT1 is required to be illuminated, then the point light sources 10 numbered L35-L40 are lighted. The TFT1-Light represent the driving signal for the predetermined point light sources (i.e., point light sources 10 numbered L35-L40) corresponding to the thin film transistor TFT1, the high level indicates that the point light sources 10 numbered L35-L40 emit light, and the low level indicates that the point light sources 10 numbered L35-L40 are extinguished.

Because the sizes of the elements in the panel driving circuit 13 are typically very small, in order to accurately control the illumination range for the elements, the point light sources 10 need to be made small. However, this increases the difficulty in the manufacturing process of the device for detecting performance of panel driving circuit 13. In order to ensure that it is not necessary to manufacture the point light sources 10 to be small so as to reduce the difficulty in the manufacturing process, the optical fibers 11 can be designed as a conical structure, that is to say, the diameter of the entrance end of the optical fiber 11 is greater than the diameter of the exit end of the optical fiber 11. The entrance end of the optical fiber 11 is connected with the point light source 10, and the exit end of the optical fiber 11 may be located above the element of the panel driving circuit 13. By setting the diameters of the entrance end and the exit end of the optical fiber 11 to be different, even if the point light source 10 is made to be relatively large, the illumination range for the elements in the panel driving circuit 13 that needs performance detection may also be controlled accurately.

Figure 8:
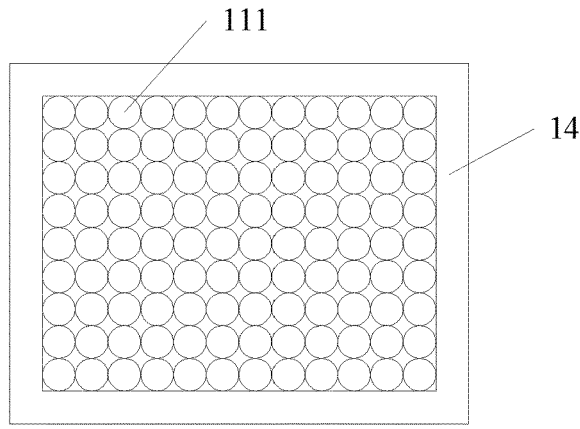
FIG. 8 is a schematic view of optical fibers and a support structure according to an embodiment of this disclosure.

Since the optical fiber 11 is typically relatively soft, in order to ensure that the exit ends of the optical fibers can be arranged above the panel driving circuit 13 stably, a support structure 14 for supporting the optical fiber 11 may be disposed around the exit end of the optical fiber 11, i.e., arranging the support structure 14 around the optical fiber 11. The support structure 14 specifically may be a hollow block structure, or a support plate provided with optical fiber through-holes, or other structures that can play the function of supporting the optical fiber 11. FIG. 8 is a schematic view of the optical fiber and the support structure according to an embodiment of this disclosure. As shown in FIG. 8, the support structure 14 is a hollow block structure. The hollow portion of the block structure is used for placing the exit ends of the optical fibers 11, so as to ensure that the exit ends of the optical fibers 11 would not be deformed. Meanwhile, the operator can also move the support structure 14 manually or by means of other mechanisms, so as to adjust the position of the exit end of the optical fiber 11 and the distance between the exit end of the optical fiber 11 and the element of the panel driving circuit 13.

In order to obtain the performance of the elements of the panel driving circuit timely and efficiently, a further embodiment of this disclosure provides a device for detecting performance of panel driving circuit on the basis of any of the above embodiments, which may comprise a detection circuit (not shown in the figure), and the specific position of the detection circuit in the device for detecting performance of panel driving circuit is not limited. The detection circuit is configured for obtaining the performance parameter of the element of the panel driving circuit based on the obtained corresponding relationship between the illumination intensity for the element of the panel driving circuit and the current value as well as the output signal of the panel driving circuit. The output signal of the panel driving circuit is dependent on the current values of respective elements of the panel driving circuit, however, it should be noted that the degrees of influences by the changes in the current values of different elements of the panel driving circuit to the output signal of the panel driving circuit are also different. A performance parameter of the element of the panel driving circuit is represented as the influence degree by the element to the output signal of the panel driving circuit. The influence degree can be digitized as percentage values, thereby it is possible to make improvement to the panel driving circuit based on the influence degree of the element to the output signal of the panel driving circuit.

Figure 9:
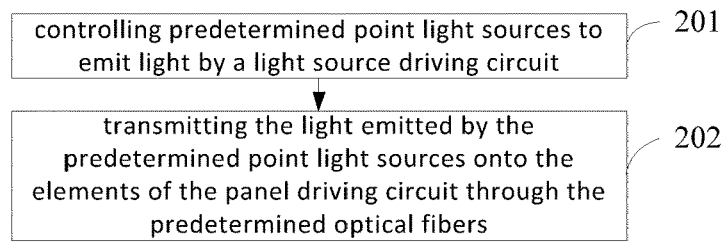
FIG. 9 is a flow chart of a method for detecting performance of a panel driving circuit according to an embodiment of this disclosure.

FIG. 9 is a flow chart of a method for detecting performance of a panel driving circuit according to another embodiment of this disclosure. Referring to FIG. 9, such performance detection method can be applied in the device for detecting performance of panel driving circuit in the above embodiments. The method for detecting performance of a panel driving circuit may comprise:

Step 201: controlling predetermined point light sources to emit light by a light source driving circuit, the predetermined point light sources are point light sources corresponding to predetermined optical fibers, and the predetermined optical fibers are one optical fiber or a plurality of optical fibers of a predetermined combination corresponding to elements of the panel driving circuit.

Step 202: transmitting the light emitted by the predetermined point light sources onto the elements of the panel driving circuit through the predetermined optical fibers.

It should be noted that the specific details of the step 201 and the step 202 can make reference to the related description of the previous embodiments, which will not be repeated herein.

Compared to the conventional method of performance detection to elements in the panel driving circuit using software simulation, in this embodiment of method for detecting performance of a panel driving circuit, the light source driving circuit drives the point light sources corresponding to a certain optical fiber or a plurality of optical fibers of a predetermined combination to emit light and transmit the light emitted onto the elements of the panel driving circuit through the optical fibers, thereby enabling the elements of the panel driving circuit corresponding to the certain optical fiber or the plurality of optical fibers of a predetermined combination to be illuminated by the emitted light. The current values of the elements that are illuminated by the light would change, thereby influencing the output signal of the panel driving circuit. Relatively more accurate detection can be implemented to the performance parameters of the elements in the panel driving circuit based on the change in the current values of the elements and the change in the output signal.

Figure 10:
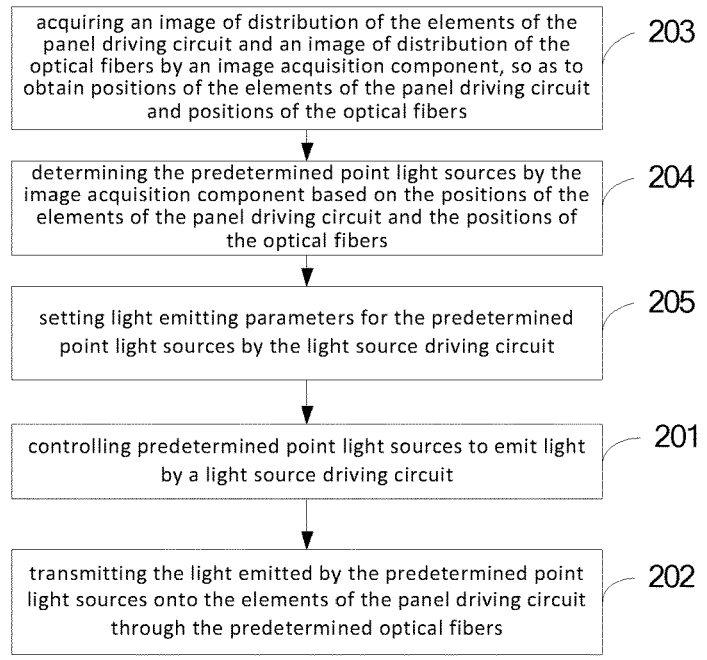
FIG. 10 is a flow chart of a method for detecting performance of a panel driving circuit according to another embodiment of this disclosure.

FIG. 10 is a flow chart of a method for detecting performance of a panel driving circuit according to yet another embodiment of this disclosure. Referring to FIG. 10, on the basis of the previous embodiment, step 203 to step 205 can be further added before the step 201. It should be noted that the sequence between the step 203 to the step 204 and the step 205 is not limited, the step 203 to the step 204 can be performed first, and then the step 205 is performed, and vice versa. Step 203 to step 205 may be described briefly as follows:

Step 203: acquiring an image of distribution of the elements of the panel driving circuit and an image of distribution of the optical fibers by an image acquisition component, so as to obtain positions of the elements of the panel driving circuit and positions of the optical fibers.

Step 204: determining the predetermined point light sources by the image acquisition component based on the positions of the elements of the panel driving circuit and the positions of the optical fibers.

Step 205: setting light emitting parameters for the predetermined point light sources by the light source driving circuit, the light emitting parameters including light emitting intensity and light emitting duration.

The details about the step 203 to the step 205 can make reference to the related contents described in the previous embodiments, which will not be repeated here.

Figure 11:
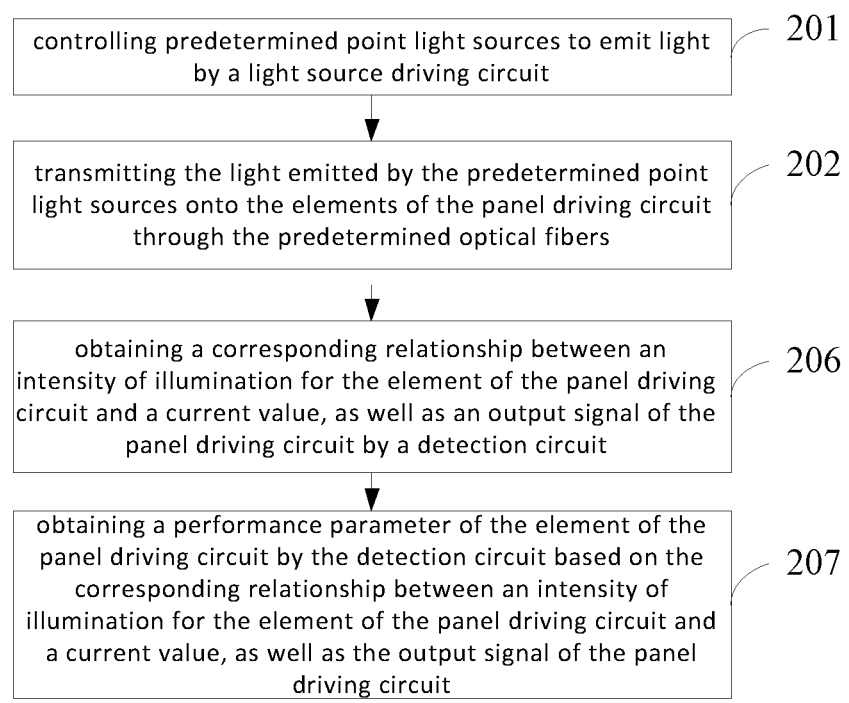
FIG. 11 is a flow chart of a method for detecting performance of a panel driving circuit according to a further embodiment of this disclosure.

FIG. 11 is a flow chart of a method for detecting performance of a panel driving circuit according to yet further embodiment of this disclosure. Referring to FIG. 11, on the basis of the above embodiment, step 206 and step 207 can be further added after the step 202, which may be described as follows:

Step 206: obtaining a corresponding relationship between an intensity of illumination for the element of the panel driving circuit and a current value, as well as an output signal of the panel driving circuit by a detection circuit.

Step 207: obtaining a performance parameter of the element of the panel driving circuit by the detection circuit based on the corresponding relationship between an intensity of illumination for the element of the panel driving circuit and a current value, as well as the output signal of the panel driving circuit.

The details of the step 206 to the step 207 can make reference to the related contents in the previous embodiments, which will not be repeated here.

The respective embodiments in this description are described in a progressive manner. The same or similar points between respective embodiments are not described repeatedly, which can make reference to each other. For example, for the embodiment of the method for detecting performance of the panel driving circuit, because its basic principle is similar as the principle of the embodiment of the device for detecting performance of panel driving circuit, the related content can make reference to part of the explanation for the embodiment of the device for detecting performance of panel driving circuit.

What are stated above are only exemplary embodiments of this disclosure, however, the protection scope of this disclosure is not limited to these. Any variations or replacements that can be easily conceived by the skilled person familiar with the present technical field within the technical scope disclosed by this disclosure should be encompassed within the protection scope of this disclosure.

The invention claimed is:

1. A device for detecting performance of display panel driving circuit, comprising a plurality of point light sources, a plurality of optical fibers and a light source driving circuit,
wherein the optical fiber is connected with the point light source, the light source driving circuit is configured for driving predetermined point light sources to emit light, the predetermined point light sources being point light sources corresponding to predetermined optical fibers, the predetermined optical fibers being one optical fiber or multiple optical fibers of a predetermined combination corresponding to elements of the display panel driving circuit,
wherein the optical fibers are configured for transmitting the light emitted by the point light sources onto the elements of the display panel driving circuit, and
wherein the device for detecting performance of the display panel driving circuit further comprises a detection circuit for obtaining a performance parameter of the element of the display panel driving circuit based on a corresponding relationship between an intensity of illumination for the element of the display panel driving circuit and a current value of the element as well as an output signal of the display panel driving circuit.

2. The device for detecting performance of display panel driving circuit according to claim 1, wherein the device for detecting performance of display panel driving circuit further comprises an image acquisition component;
herein the image acquisition component is configured for acquiring an image of distribution of the elements of the display panel driving circuit and an image of distribution of the optical fibers, so as to obtain positions of the elements of the display panel driving circuit and positions of the optical fibers, and
wherein the light source driving circuit is further configured for driving the predetermined point light sources to emit light based on the positions of the elements of the display panel driving circuit and the positions of the optical fibers.

3. The device for detecting performance of display panel driving circuit according to claim 2, wherein the plurality of point light sources are arranged to be moveable relative to the image acquisition component.

4. The device for detecting performance of display panel driving circuit according to claim 3, wherein the image acquisition component is a CMOS image sensor.

5. The device for detecting performance of display panel driving circuit according to claim 2, wherein the optical fiber is a conical structure, a diameter of an entrance end of the optical fiber is greater than a diameter of an exit end of the optical fiber, and the entrance end is connected with the point light source, the exit end is located above the elements of the display panel driving circuit.

6. The device for detecting performance of display panel driving circuit according to claim 1, wherein the optical fiber is connected with the point light source through an optical fiber interface.

7. The device for detecting performance of display panel driving circuit according to claim 6, wherein the optical fiber is a conical structure, a diameter of an entrance end of the optical fiber is greater than a diameter of an exit end of the optical fiber, and the entrance end is connected with the point light source, the exit end is located above the elements of the display panel driving circuit.

8. The device for detecting performance of display panel driving circuit according to claim 1, wherein if the predetermined optical fiber is one optical fiber corresponding to the elements of the display panel driving circuit, the one optical fiber corresponds to one of the point light sources.

9. The device for detecting performance of display panel driving circuit according to claim 8, wherein the optical fiber is a conical structure, a diameter of an entrance end of the optical fiber is greater than a diameter of an exit end of the optical fiber, and the entrance end is connected with the point light source, the exit end is located above the elements of the display panel driving circuit.

10. The device for detecting performance of display panel driving circuit according to claim 1, wherein if the predetermined optical fibers are multiple optical fibers of a predetermined combination corresponding to the elements of the display panel driving circuit, the multiple optical fibers are arranged in an array.

11. The device for detecting performance of display panel driving circuit according to claim 10, wherein the optical fiber is a conical structure, a diameter of an entrance end of the optical fiber is greater than a diameter of an exit end of the optical fiber, and the entrance end is connected with the point light source, the exit end is located above the elements of the display panel driving circuit.

12. The device for detecting performance of display panel driving circuit according to claim 1, wherein the optical fiber is a conical structure, a diameter of an entrance end of the optical fiber is greater than a diameter of an exit end of the optical fiber, and the entrance end is connected with the point light source, the exit end is located above the elements of the display panel driving circuit.

13. The device for detecting performance of display panel driving circuit according to claim 1, wherein the device for detecting performance of display panel driving circuit further comprises a support structure for supporting the optical fibers, the support structure being arranged to surround the optical fibers.

14. A method for detecting performance of display panel driving circuit, for applying to a device for detecting performance of display panel driving circuit, the device comprising a plurality of point light sources, a plurality of optical fibers, a light source driving circuit, and a detection device, the optical fiber being connected with the point light source, the light source driving circuit being configured for driving predetermined point light sources to emit light, the predetermined point light sources being point light sources corresponding to predetermined optical fibers, the predetermined optical fibers being one optical fiber or multiple optical fibers of a predetermined combination corresponding to elements of the display panel driving circuit, the optical fibers being configured for transmitting the light emitted by the point light sources onto the elements of the display panel driving circuit, the detection circuit being configured for obtaining a performance parameter of the element of the display panel driving circuit based on a corresponding relationship between an intensity of illumination for the element of the display panel driving circuit and a current value of the element as well as an output signal of the display panel driving circuit, wherein the method comprises:

controlling predetermined point light sources to emit light by a light source driving circuit, the predetermined point light sources being point light sources corresponding to predetermined optical fibers, the predetermined optical fibers being one optical fiber or multiple optical fibers of a predetermined combination corresponding to elements of the display panel driving circuit;

transmitting the light emitted by the predetermined point light sources onto the elements of the display panel driving circuit through the predetermined optical fibers, by means of a detection circuit, obtaining a corresponding relationship between an intensity of illumination for the element of the display panel driving circuit and a current value of the element, as well as an output signal of the display panel driving circuit, and obtaining a performance parameter of the element of the display panel driving circuit based on the corresponding relationship between an intensity of illumination for the element of the display panel driving circuit and a current value of the element, as well as the output signal of the display panel driving circuit.

15. The method according to claim 14, further comprising:

prior to controlling the predetermined light sources to emit light, acquiring an image of distribution of the elements of the display panel driving circuit and an image of distribution of the optical fibers by an image acquisition component, so as to obtain positions of the elements of the display panel driving circuit and positions of the optical fibers, and determining the predetermined point light sources by the image acquisition component based on the positions of the elements of the display panel driving circuit and the positions of the optical fibers.

16. The method according to claim 14, further comprising:

prior to controlling the predetermined light sources to emit light, setting light emitting parameters for the predetermined point light sources by the light source driving circuit, the light emitting parameters including light emitting intensity and light emitting duration.

17. The method according to claim 14, wherein the device further comprises an image acquisition component;

herein the image acquisition component is configured for acquiring an image of distribution of the elements of the display panel driving circuit and an image of distribution of the optical fibers, so as to obtain positions of the elements of the display panel driving circuit and positions of the optical fibers, and wherein the light source driving circuit is further configured for driving the predetermined point light sources to emit light based on the positions of the elements of the display panel driving circuit and the positions of the optical fibers.

18. The method according to claim 14, wherein the optical fiber is connected with the point light source through an optical fiber interface.

19. The method according to claim 14, wherein if the predetermined optical fiber is one optical fiber corresponding to the elements of the display panel driving circuit, the one optical fiber corresponds to one of the point light sources.

20. The method according to claim 14, wherein if the predetermined optical fibers are multiple optical fibers of a predetermined combination corresponding to the elements of the display panel driving circuit, the multiple optical fibers are arranged in an array.

* * * * *